(12) United States Patent
Suzuki

(10) Patent No.: US 6,693,721 B1
(45) Date of Patent: Feb. 17, 2004

(54) IMAGE PROCESSING SYSTEM THAT SWITCHES PROCESS BETWEEN MONOCHROMATIC IMAGE AND COLOR IMAGE, AND IMAGE DATA PROCESSING METHOD

(75) Inventor: Hiroyuki Suzuki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/437,456

(22) Filed: Nov. 10, 1999

(30) Foreign Application Priority Data

Nov. 12, 1998 (JP) ............................................. 10-322445

(51) Int. Cl.$^7$ .............................................. G06K 15/00

(52) U.S. Cl. .................................... 358/1.15; 358/1.13

(58) Field of Search .................................. 358/1.15, 1.4, 358/1.6, 1.9, 1.13, 2.1, 3.24, 515, 517, 462; 382/176; 345/580, 532, 533, 549, 563, 573

(56) References Cited

U.S. PATENT DOCUMENTS 5,696,842 A 12/1997 Shirasawa et al. .......... 382/176
6,549,657 B2 * 4/2003 Ohta et al. .................. 382/173

FOREIGN PATENT DOCUMENTS

JP 03-177961 A 8/1991

* cited by examiner

*Primary Examiner*—Arthur G. Evans
(74) *Attorney, Agent, or Firm*—Sidley Austin Brown & Wood LLP

(57) ABSTRACT

In order to improve the processing speed of an image processing apparatus including a plurality of image processors processing input image data divisionally in parallel, determination is made whether the document image is a color document or a black-and-white document. In the case of a color document, respective R, G and B data are processed by a plurality of MPUs. In the case of a black-and-white document, the image data is stored in a data storage memory, and then divided into three to be processed by the plurality of MPUs. The image data processed by the plurality of MPUs is recorded in a data storage memory as one image data.

22 Claims, 12 Drawing Sheets

IMAGE PROCESSING SYSTEM THAT SWITCHES PROCESS BETWEEN MONOCHROMATIC IMAGE AND COLOR IMAGE, AND IMAGE DATA PROCESSING METHOD

This application is based on Japanese Patent Application No. 10-322445 filed in Japan, the contents of which are hereby incorporated by reference.

BACKGROUND OF THE INVENTION

1. Field of the Invention

The present invention relates to image processing systems, and particularly, to an image processing system including a plurality of image processors that process input image data divisionally in parallel.

2. Description of the Related Art

A conventional image processing system that processes a great amount of documents efficiently using an automatic document feeder (ADF) is well known. The processed documents include a color document (document constituted by data of a plurality of colors) and a monochromatic (single color) document.

SUMMARY OF THE INVENTION

An object of the present invention is to improve the processing speed of an image processing system.

According to an aspect of the present invention, an image data processing apparatus includes a determination unit determining whether image data to be processed represents a monochromatic image or a color image, and a processing unit processing image data.

The processing unit includes a plurality of processors processing image data divisionally in parallel, and a control unit assigning image data to be processed to each processor according to the determination result of the determination unit.

According to another aspect of the present invention, an image data processing method includes the steps of determining whether image data to be processed represents a monochromatic image or a color image, dividing image data to be processed into a plurality of blocks and assigning the divided image data to a plurality of processors according to the determination result of the determination step, and processing in parallel the image data assigned in the assignment step with the plurality of processors.

According to a further aspect of the present invention, an image data processing apparatus includes an image reader dividing a document image into image data of a plurality of color components and reading out the divided image data, a determination unit determining whether the document image read out by the image reader represents a monochromatic image or a color image, and a processing unit processing image data.

The processing unit includes a plurality of processors dividing and processing in parallel the process of the image data, and a control unit assigning image data to be processed to each processor according to the determination result of the determination unit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
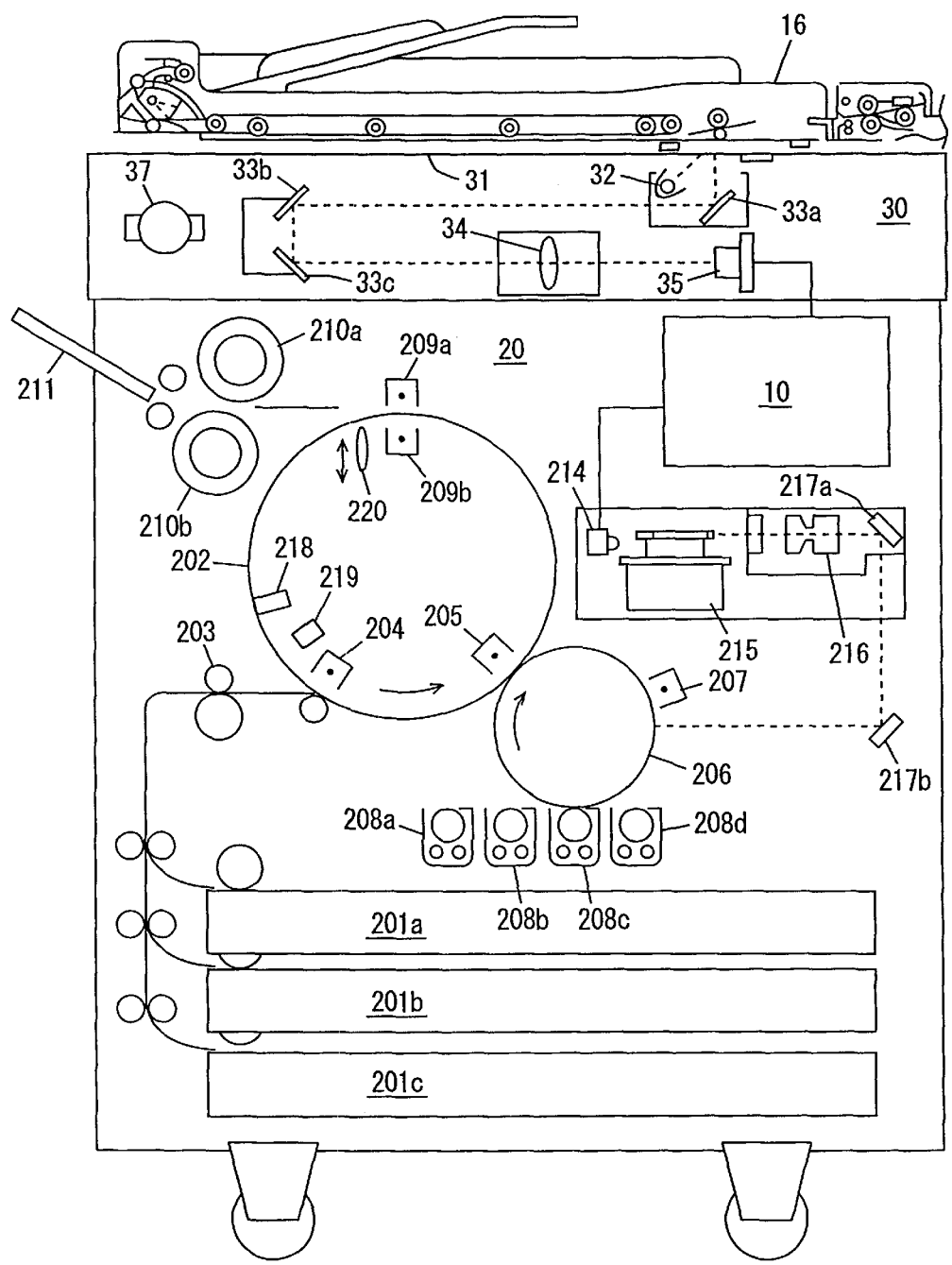
FIG. 1 shows a structure of a digital copy machine according to a first embodiment of the present invention.

Referring to FIG. 1, a scanner 30 reads out a document. An image processing device 10 carries out image processing. A printer 20 receives a signal from image processing device 10 to print out an image corresponding to the document image on a recording sheet in full color.

The operation of document readout by scanner 30 will be described here. A document is supplied onto a document platen 31 by an automatic document feeder (referred to as ADF hereinafter) 16. The document on document platen 31 is irradiated with light from lamp 32. The light reflected from the document passes through mirrors 33a, 33b and 33c, whereby an image is formed on a solid state image sensor 35 by a lens 34. The image data is converted into the red (R), green (G) and blue (B) components of full color information and send to image processing device 10.

Image processing device 10 determines whether the read document is a color document or a black-and-white document to carry out an image process according to the determination result. The image data subjected to the image process is sent to a printer 20. The image data sent from image processing device 10 causes a laser emitting unit 214 to be modulated according to the image signal level by the semiconductor laser drive. The laser beam passes through a polygon mirror 215, an optical system 216, and mirrors 217a and 217b, whereby a photoconductor drum 206 is scanned. As a result, an electrostatic latent image is formed.

The developing unit is formed of a cyan (C) developer 208a, a magenta (M) developer 208b, a yellow (Y) developer 208c, and a black (Bk) developer 208d. Each of developers 208a–208d is brought into contact with photoconductor drum 206, whereby the electrostatic latent image formed on photoconductor drum 206 is developed. During this process, a recording sheet fed from sheet cassettes 201*a*, 201*b* and 201*c* is wound around a transfer drum 202 by an attachment charger 204 and transported to a transfer position by a timing roller 203. The toner image developed on photoconductor drum 206 is transferred onto recording sheet by transfer charger 205. Reference position sensors 218 and 219 are provided at the transfer drum. Following the sequential transfer of the toner image of the four colors of C, M, Y and Bk, the recording sheet is detached by detach chargers 209*a* and 209*b* and conveyed. The recording sheet is detached from transfer drum 202 by a claw 220. The recording sheet passes through fixture rollers 210*a* and 210*b* to be discharged to discharge tray 211.

Figure 2:
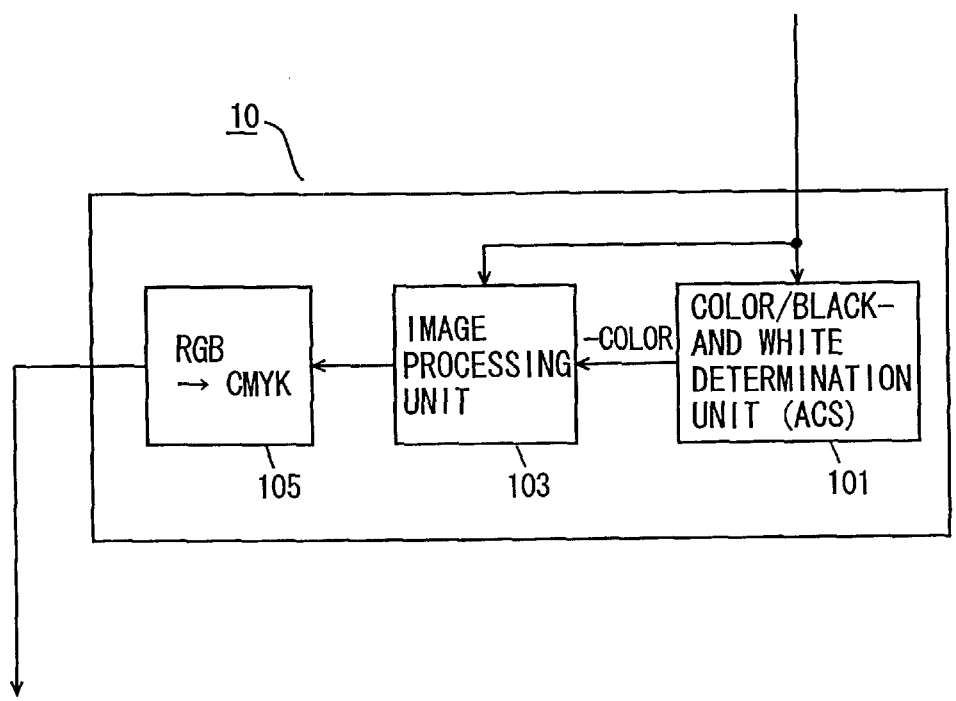
FIG. 2 is a block diagram showing a structure of an image processing apparatus 10 of FIG. 1.

FIG. 2 is a block diagram showing a structure of image processing device 10 of FIG. 1. Referring to FIG. 2, image processing device 10 includes a color/black-and-white determination unit (ACS) 101 determining whether the read out document is a color document or a black-and-white document, an image processing unit 103 having a plurality of image processors to divide and carry out the process on the image data in parallel, and a conversion unit 105 converting the signal of RGB into signals C, M, Y and Bk corresponding to the color of the developers of cyan, magenta, yellow and black, respectively.

Image processing unit 103 alters the division of the process of the plurality of image processors according to a determination signal (-COLOR) from color/black-and-white determination unit (ACS) 101.

Figure 3:
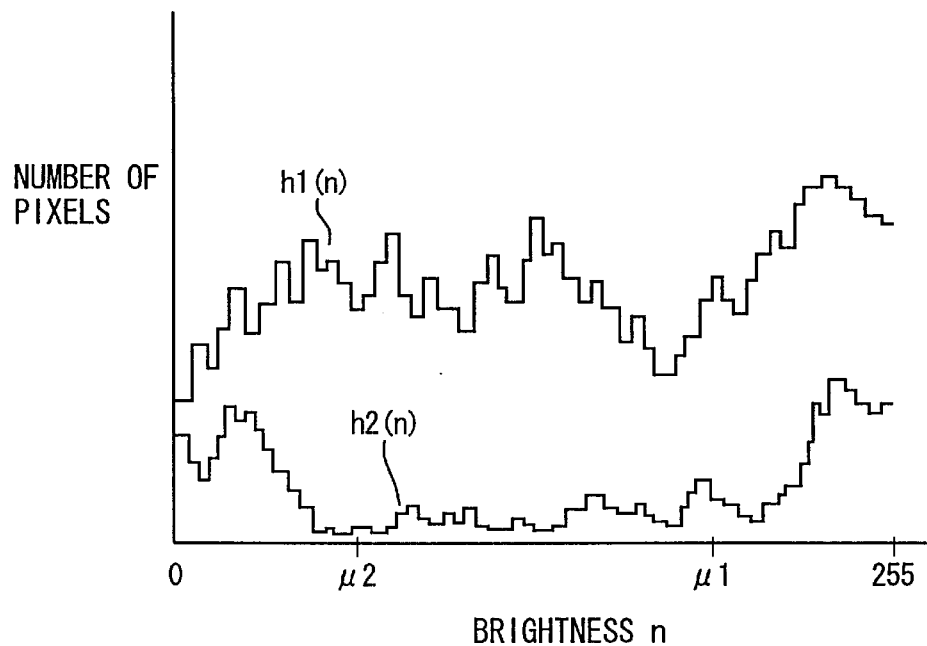
FIG. 3 is a diagram to describe histogram data recorded in the color/black-and-white determination unit of FIG. 2.

Color/black-and-white determination unit (ACS) 101 includes a histogram memory storing two histograms. Referring to FIG. 3, one histogram is histogram h1 (n) of the brightness of all the pixels in the image data read out, and the other is brightness histogram h2 (n) of the achromatic dot included in the image data read out.

The value of n represents the brightness of the pixel, being any of 0–255. The pixel with n as 0 is a pixel of lowest brightness whereas the pixel with n as 255 is a pixel of the highest brightness.

More specifically, the value of histogram h1 (n) represents the number of pixels having the brightness of n.

Figure 4:
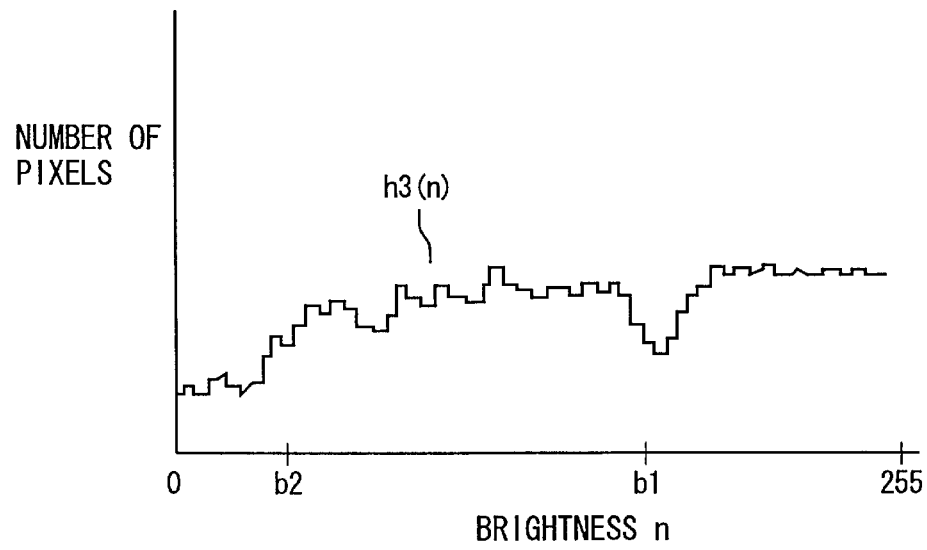
FIG. 4 is a diagram to describe another histogram obtained from the histogram of FIG. 3.

By subtracting the value of histogram h2 (n) from the value of histogram h1 (n), a histogram h3 (n) of the brightness of the pixels corresponding to the chromatic color included in the document is produced as shown in FIG. 4.

Determination of whether a certain pixel included in the image data is a chromatic color dot (pixel of chromatic color) or an achromatic dot (pixel of monochromatic color) is made by identifying the maximum value and the minimum value of the R data, G data and B data which are the color data of that certain pixel and subtracting the identified minimum value from the identified maximum value. When the subtracted result is equal to or smaller than a predetermined value (SREF), that certain pixel is determined to be an achromatic dot. Only the number of the achromatic dots is recorded in histogram h2 (n).

According to these histograms, the number of dots Wn constituting the background (white) region in the document, the number of dots Mn of the intermediate tone (gray) region of black-and-white, the number of dots Bn of the black region, the number of dots Cn of the color region, and the total number Sn of the brightnessest histogram of all the pixels (representing the total number of pixels within the document size) are calculated from the following equation (1).

$$Wn = \sum_{n=\mu_1}^{255} h2(n) \quad (1)$$

$$Mn = \sum_{n=\mu_2}^{\mu_1} h2(n)$$

$$Bn = \sum_{n=0}^{\mu_2} h2(n)$$

$$Sn = \sum_{n=0}^{255} h1(h)$$

$$h3(n) = h1(n) - h2(n)$$

$$Cn = \sum_{n=b_2}^{b_1} h3(n)$$

In the above equation (1), $\mu_1$ represents the threshold value to classify an achromatic dot as a white dot and an intermediate tone dot, whereas $\mu_2$ represents the threshold value to classify an achromatic dot as an intermediate tone dot or a black dot.

Also, $b_1$ and $b_2$ represent the upper limit value and the lower limit value, respectively, of the brightness to set the dots not included in the achromatic dot as a dot of a color region.

Figure 5:
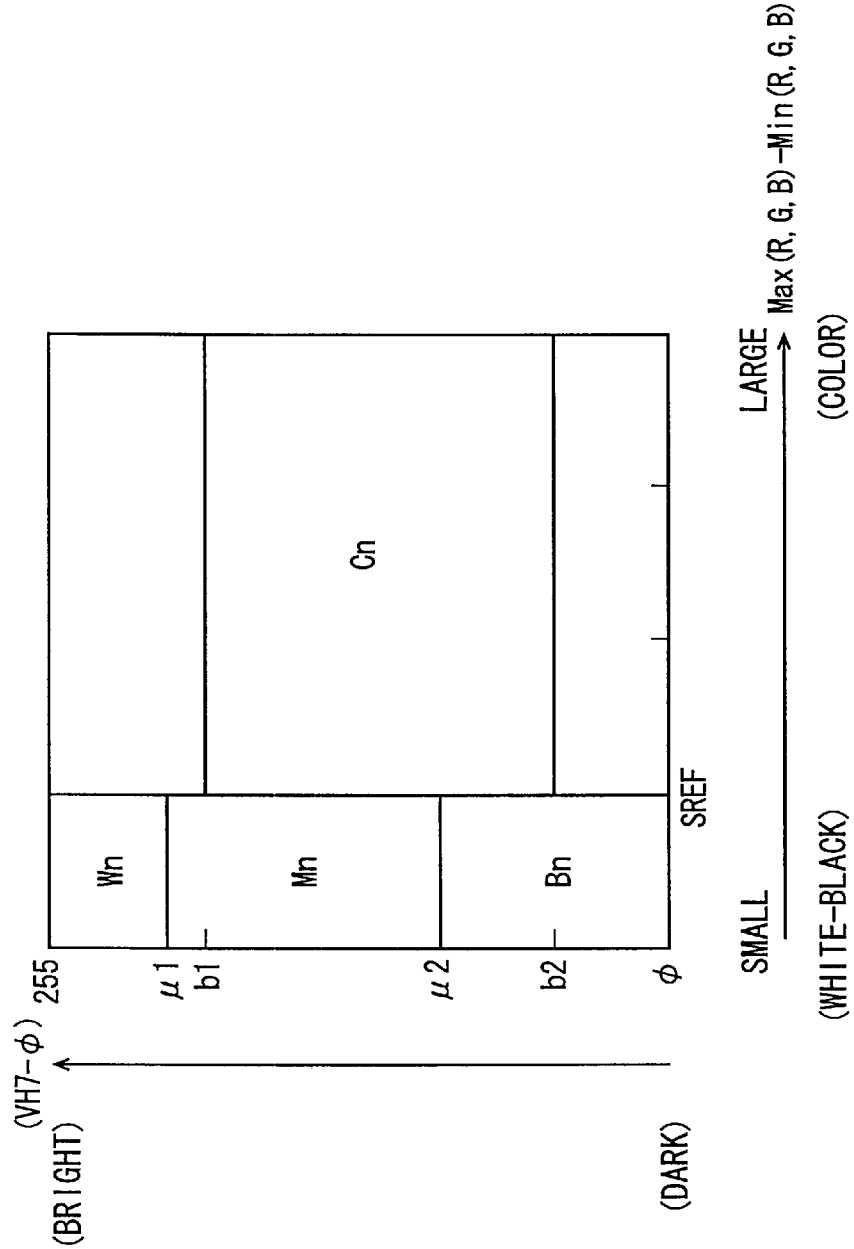
FIG. 5 is a diagram to describe the process carried out by a color/black-and-white determination unit 101.

FIG. 5 is a diagram representing a region formed of brightness and hue.

Referring to FIG. 5, the horizontal axis represents the difference between the maximum value and the minimum value out of the R data, G data and B data which are the color data of a pixel, and the vertical axis represents the brightness of the pixel.

Classification of whether a pixel is a chromatic color or achromatic is made according to threshold value SREF of the horizontal axis.

From the dots belonging to the achromatic region divided by the threshold value SREF (the region at the left side in the drawing), a white dot, a gray dot, and a black dot according to the boundary of brightness $\mu_1$ and $\mu_2$ are classified.

From the dots in the chromatic color region, determination is made that dots in the brightness range of $b_2$ to $b_1$ is a dot of the color region.

In color/black-and-white determination unit 101, determination is made whether the document is a black-and-white document or a color document according to the variables of Sn and Cn. More specifically, the document is determined to be a monochromatic document when the value of Cn/Sn is equal to or lower than a reference value, and determined to be a color document when the value of Cn/Sn is larger than the reference value.

Figure 6:
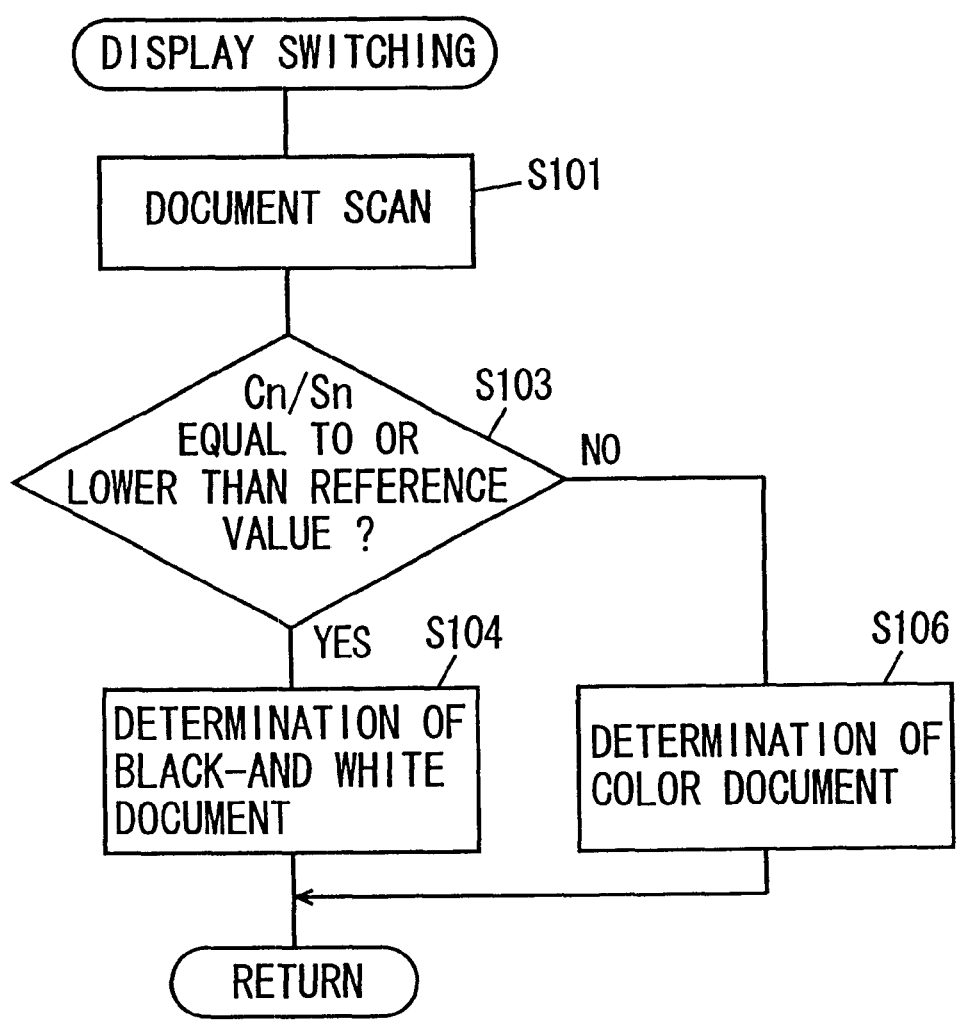
FIG. 6 is a flow chart showing the process of determining whether the document is a color document or a black-and-white document.

FIG. 6 is a flow chart of the process carried out by color/black-and-white determination unit 101. Referring to FIG. 6, at step 101, the document is scanned by scanner unit 30, whereby image data of the document is obtained. At step S103, the brightness histogram of all the dots and the brightness histogram of the achromatic dots are analyzed to determine whether Cn/Sn is not larger than a reference value.

When YES at step S103, determination is made that that document is a black-and-white document at step S104, otherwise determined to be a color document at step S106.

Figure 7:
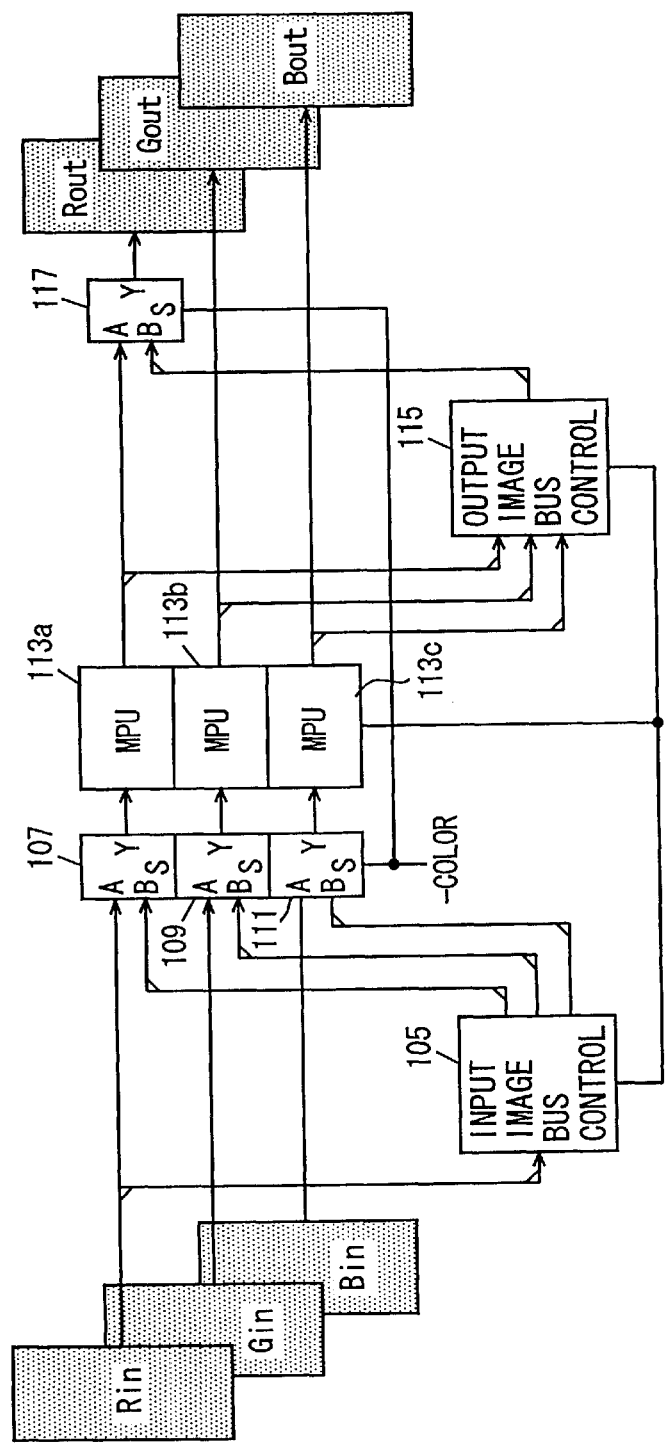
FIG. 7 is a block diagram showing a structure of an image processing unit 103 of FIG. 2.

FIG. 7 is a block diagram showing a structure of an image processing unit 103. Referring to FIG. 7, image processing unit 103 includes an R data storage memory Rin, a G data storage memory Gin, a B data storage memory Bin, an input image bus control unit 105 dividing the image data output from R data storage memory Rin into three for output, selectors 107, 109 and 111 selecting and providing the outputs of R, G and B data storage memories Rin, Gin and Bin or the output of input image bus control unit 105, MPU (microprocessing unit) 113a–113c carrying out an image process not relatively associated with R, G and B such as γ correction, log correction, shading correction and scaling rate correction on the outputs of selectors 107, 109 and 111, an output image bus control unit 115 combining the outputs of MPU 113a–113c to output the same as one image data, a selector 117 selecting and providing the output of MPU 113a or output image bus control unit 115, an R data storage memory Rout storing the output of selector 117, a G data storage memory Gout storing the output of MPU 113b, and a B data storage memory Bout storing the output of MPU 113c.

Selectors 107, 109 and 111 determine the data to be output by the signal from color/black-and-white determination unit 101. More specifically, selectors 107, 109 and 111 provide the outputs of R, G and B data storage memories Rin, Gin and Bin when determination is made that the color image corresponds to a color document, and provide the output of input image bus control unit 105 when determination is made that the document image corresponds to a black-and-white document.

Selector 117 has its output determined by the signal from color/black-and-white determination unit 101. Selector 117 provides the output from MPU 113a and the output from output image bus control unit 115 when the determination result indicates color and black-and-white, respectively.

Figure 8:
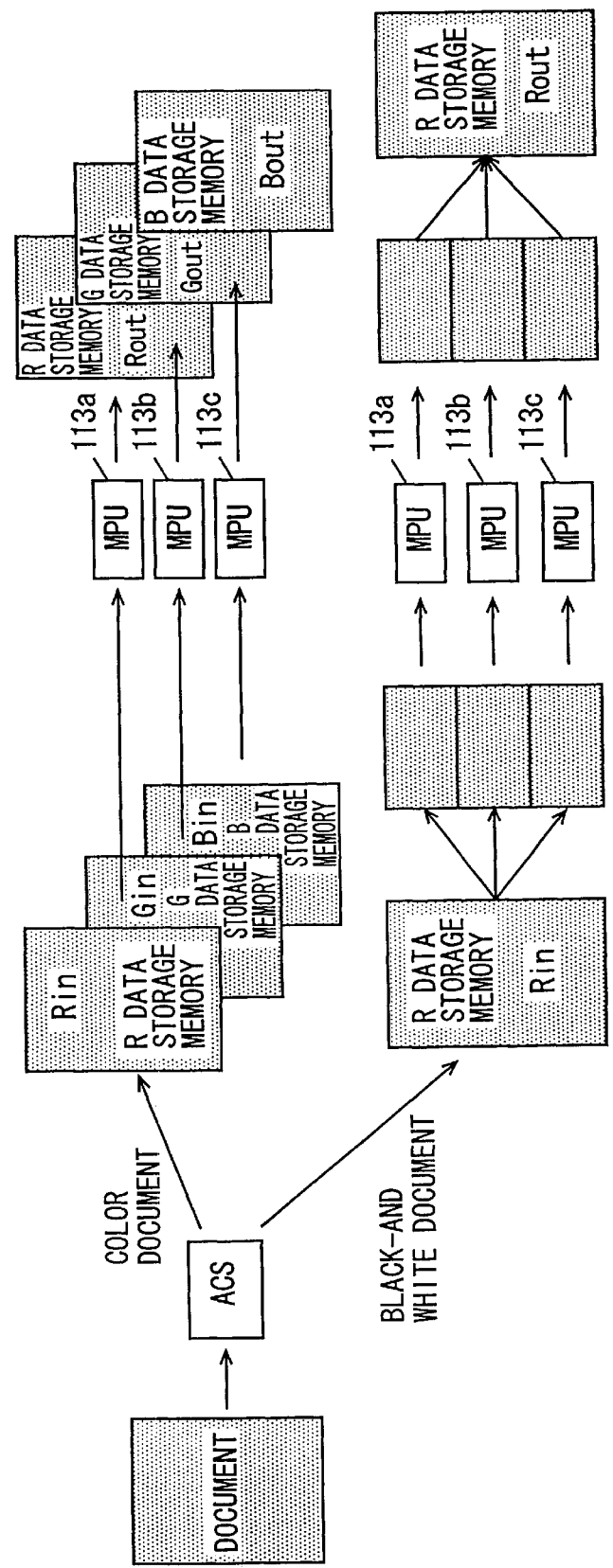
FIG. 8 is a diagram to describe the advantage of the first embodiment.

FIG. 8 is a diagram to describe the operation of image processing unit 103 of FIG. 7. Referring to FIG. 8, determination is made whether the document image data corresponds to a color document or a black-and-white document by color/black-and-white determination unit (ACS) 101. When the determination result indicates a color document, the R data, G data and B data of that color document are stored in R data storage memory Rin, G data storage memory Gin and B data storage memory Bin, respectively. Then, MPU 113a–113c process the color image data stored in respective data storage memories. The processed result is stored in respective R data storage memory Rout, G data storage memory Gout, and B data storage memory Bout.

When the determination result indicates a black-and-white document, the R data, G data and B data of the black-and-white document are converted into monochromatic image data which is the average thereof and stored in R data storage memory Rin. Then, input image bus control unit 105 divides the image data stored in R data storage memory Rin into three and transmits respective image data to MPU 113a–113c. The processed results from MPU 113a–113c are send to output image bus control unit 115 to be combined as one image data, and then stored in R data storage memory Rout. Any of the R data, G data and B data may be stored in R data storage memory Rin.

In the present embodiment, the R data, G data and B data corresponding to a color document are respectively processed by the three MPUs whereas one image data corresponding to a black-and-white document is processed using the three MPUs. Accordingly, the processing speed when there are a mixture of a color document and a monochromatic document and also when there are only monochromatic documents to be processed can be improved in the system where image processing is carried out at one time on a plurality of documents through the ADF.

Second Embodiment

The digital copy machine according to the second embodiment of the present invention has a structure identical to that of the copy machine of the first embodiment. Therefore, description thereof will not be repeated. In the second embodiment, an image processing unit shown in FIG. 9 is used instead of image processing unit 103 of FIG. 7.

Figure 9:
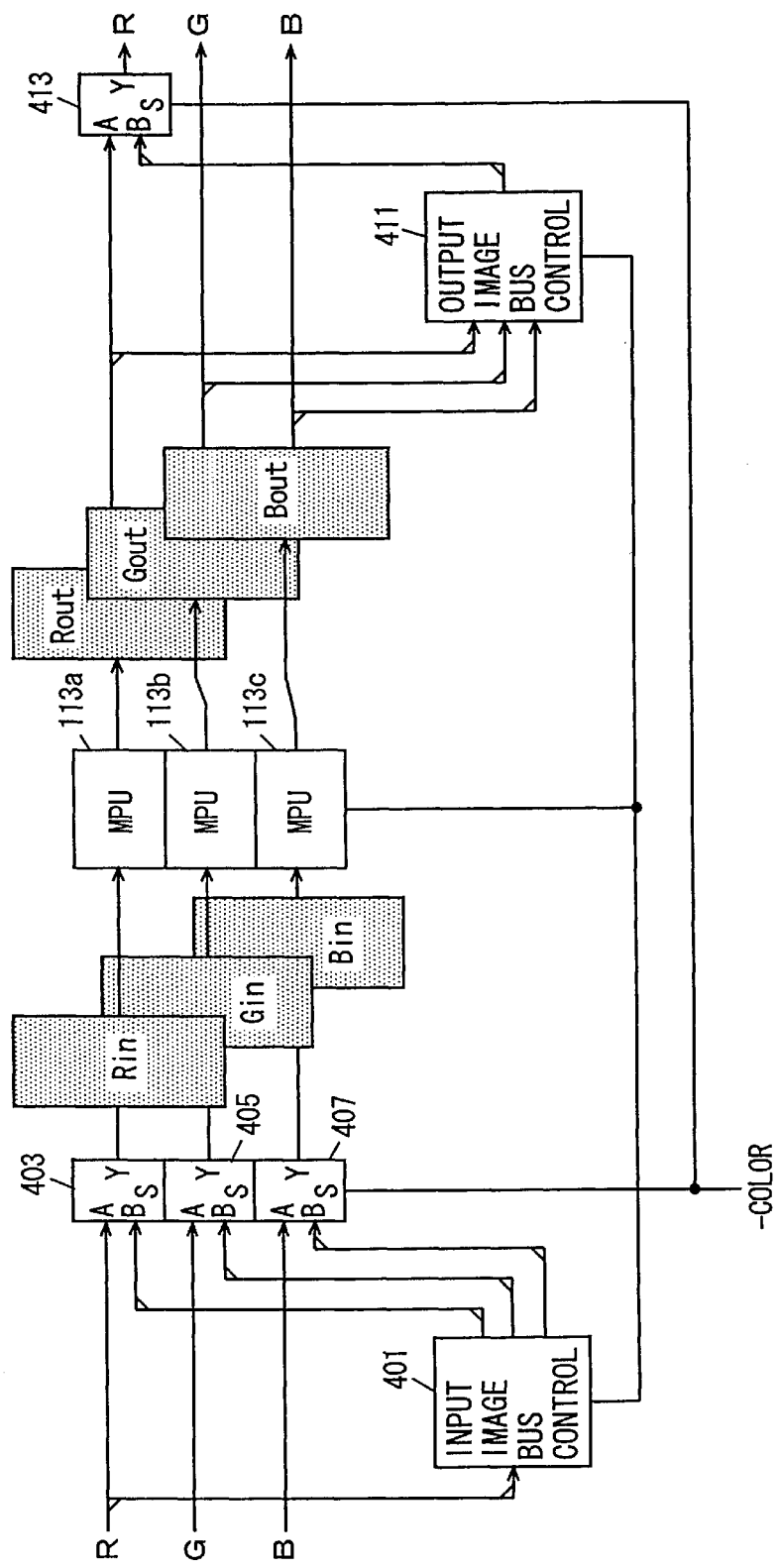
FIG. 9 is a block diagram showing a structure of an image processing unit according to a second embodiment of the present invention.

Referring to FIG. 9, the image processing unit of the second embodiment includes an input image bus control unit 401 dividing the received image R data for every one page of document for output, selectors 403, 405 and 407 selecting the output of the R, G, B data or the output from input image bus control unit 401, an R data storage memory Rin, a G data storage memory Gin and a B data storage memory Bin storing the data of selectors 403, 405 and 407, respectively, MPU 113a–113c processing the data stored in R, G, B data storage memories Rin, Gin and Bin, respectively, an R data storage memory Rout, a G data storage memory Gout and a B data storage memory Bout storing the outputs of MPU 113a–113c, respectively, an output image bus control unit 411 setting the outputs of R, G and B data storage memories Rout, Gout and Bout as a series of image data, and a selector 413 selecting and providing the data from R data storage memory Rout or output image bus control unit 411.

Selectors 403, 405 and 407 carry out selection according to the signal from color/black-and-white determination unit 101. The R, G and B data are selected when the determination result corresponds to a color document. The data from input image bus control unit 401 is selected and output when the determination result corresponds to a black-and-white document.

Selector 413 also carries out selection according to the determination result from color/black-and-white determination unit 101. The data from R data storage memory Rout is selected when the determination result corresponds to a color document. The data from output image bus control unit 411 is selected when the determination result corresponds to a black-and-white document.

Figure 10:
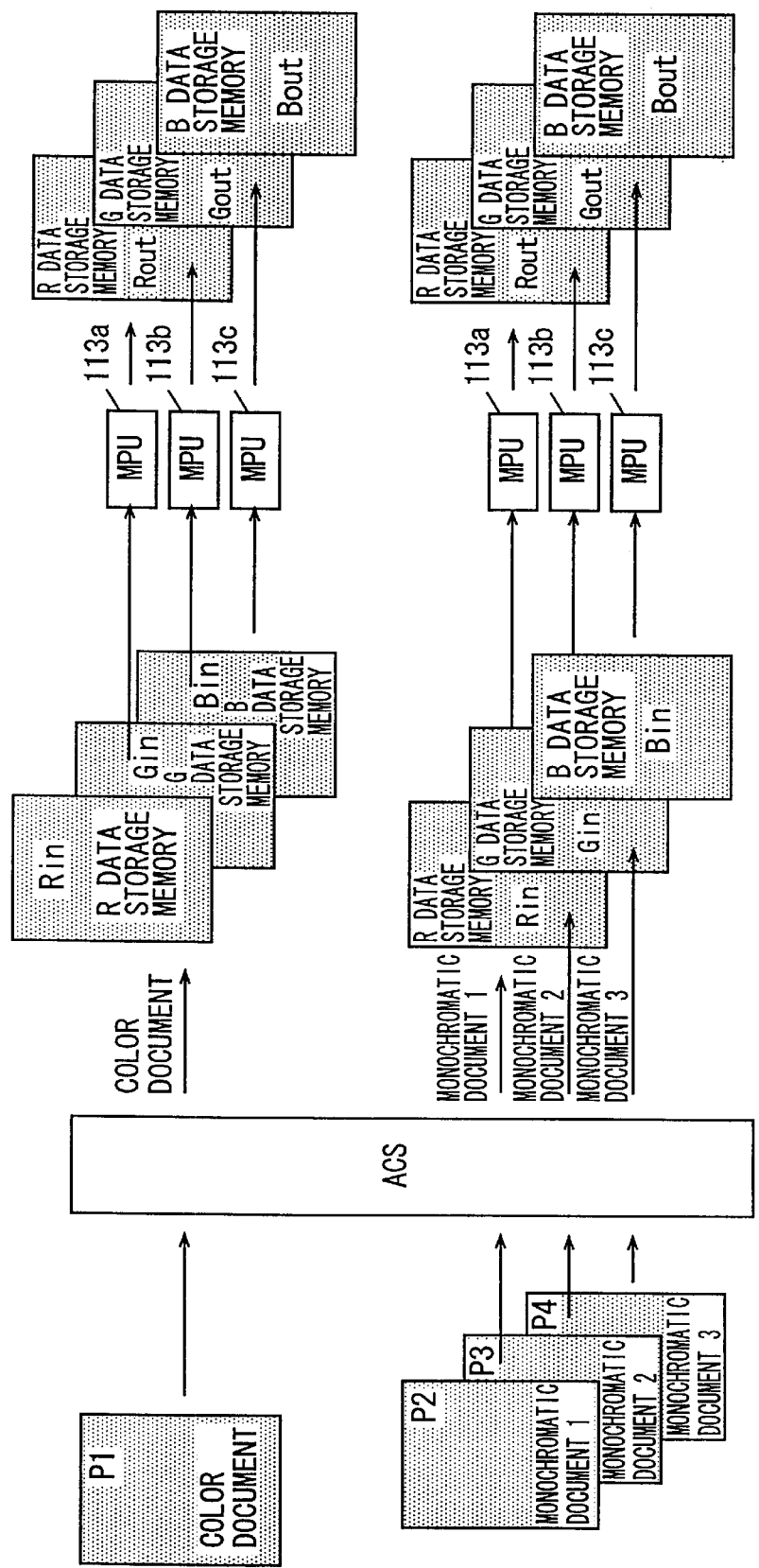
FIG. 10 is a diagram to describe the advantage of the second embodiment.

FIG. 10 is a diagram to describe the operation of the image processing unit according to the present embodiment. When the document image data to be processed corresponds to a color document P1, the R, G and B data of that document are stored in R data storage memory Rin, G data storage memory Gin and B data storage memory Bin, and processed by MPU 113a–113c respectively. The processed data are stored in R data storage memory Rout, G data storage memory Gout and B data storage memory Bout.

When the determination of color/black-and-white determination unit 101 continuously indicates a black-and-white document, the image data of three pages of black-and-white documents P2–P4 at most are stored in R data storage memory Rin, G data storage memory Gin and B data storage memory Bin, respectively, and processed by MPU 113a–113c, respectively. The processed results are stored in R data storage memory Rout, G data storage memory Gout, and B data storage memory Bout, and then output from the signal line of the R data by the function of output image bus control unit 411.

FIG. 10 corresponds to the case where there are three continuous black-and-white documents. When there are two continuous black-and-white documents, the image data are processed by MPU 113a and 113b using R data storage memory Rin and G data storage memory Gin. When there is only one black-and-white document, the image data is processed using only R data storage memory Rin and MPU 113a.

In the present embodiment, document data, when there are continuous black-and-white documents, can be processed in parallel by MPU 113a–113c. Therefore, the processing speed can be improved.

Third Embodiment

The digital copy machine of the third embodiment has a structure identical to that of the copy machine of the first embodiment. Therefore, description thereof will not be described. The digital copy machine of the third embodiment employs an image processing unit shown in FIG. 11, instead of image processing unit 103 of FIG. 7.

Figure 11:
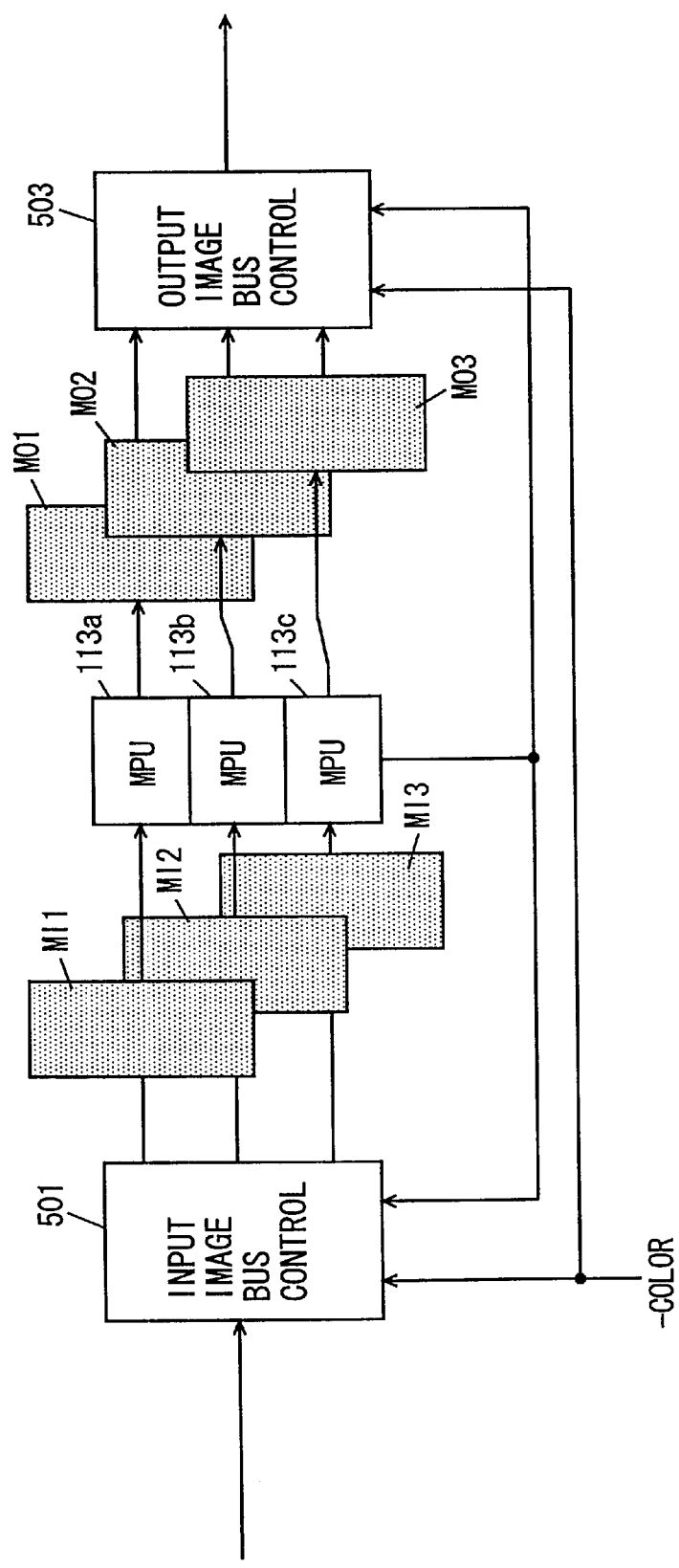
FIG. 11 is a block diagram showing a structure of an image processing unit according to a third embodiment of the present invention.

Referring to FIG. 11, the image processing unit of the present embodiment includes an input image bus control unit 501 controlling the input image data flow, R, G and B data storage memories MI1–MI3 storing the R, G and B image data of one page, respectively, MPU 113a–113c processing the data of R, G and B data storage memories MI1-MI3, respectively, R, G and B data storage memories MO1-MO3 storing the processed results of MPU 113a–113c, respectively, and an output image bus control unit 503 selecting and providing the output results of R, G and B data storage memories MO1-MO3.

Input image bus control unit 501 is controlled according to the outputs of MPU 113a–113c and color/black-and-white determination unit 101.

Figure 12:
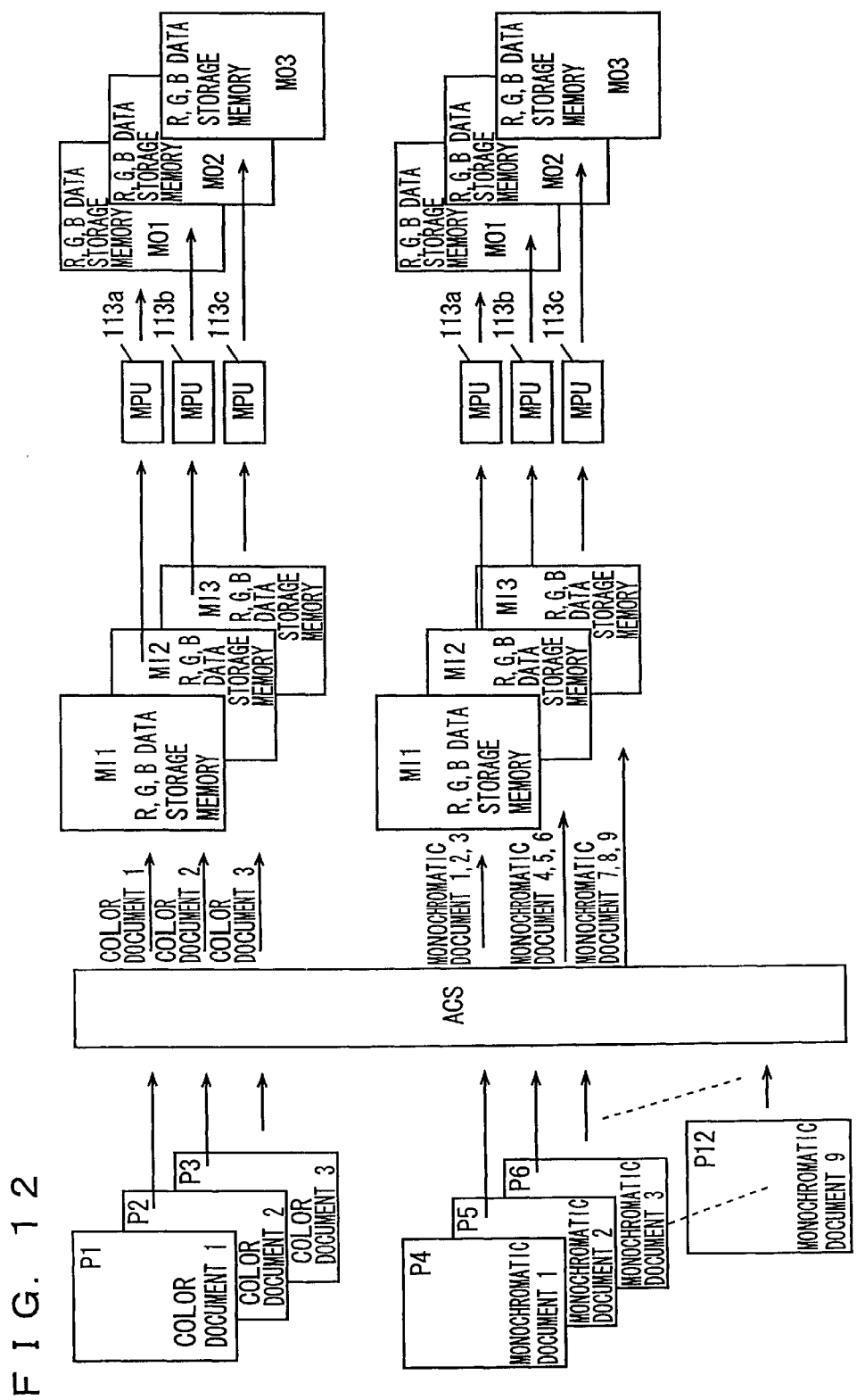
FIG. 12 is a diagram to describe the advantage of the third embodiment.

FIG. 12 is a diagram to describe the operation of the image processing unit of the present embodiment.

Referring to FIG. 12, R, G and B data storage memories MI1-MI3 each have a memory capacity to store one page of image data of the respective three colors. When there are three continuous color documents, the data of these color documents are stored for every one page in each of R, G and B data storage memories MI1-MI3. The stored image data are respectively processed by MPU 113a–113c to be stored in respective R, G and B data storage memories MO1-MO3.

Thus, the process of three pages at most can be carried out in parallel when there are continuous color documents. As to black-and-white documents, the black-and-white image data of three pages can be stored in one of the R, G and B data storage memories since the amount of the image data is ⅓ the amount of a color document. Therefore, the process of 9 pages at most for black-and-white documents can be carried out by MPU 113a–113c using R, G and B data storage memories MI1-MI3.

In the image processing unit of the present embodiment, the number of pages of the image data to be processed is altered according to the type of the image data. Therefore, the total speed in processing a mixture of color and black-and-white documents continuously at one time using an ADF and the like can be improved.

Modification

In the above embodiments, the input image bus control unit and the output image bus control unit are controlled by hardware. Alternatively, control can be carried out with software. For example, an image processing program is installed in the MPU through a recording medium, whereby the program is executed by each MPU. For example, the program corresponding to the flow chart shown in FIG. 13 can be executed instead of the program corresponding to the flow chart of FIG. 6 in the first embodiment.

Figure 13:
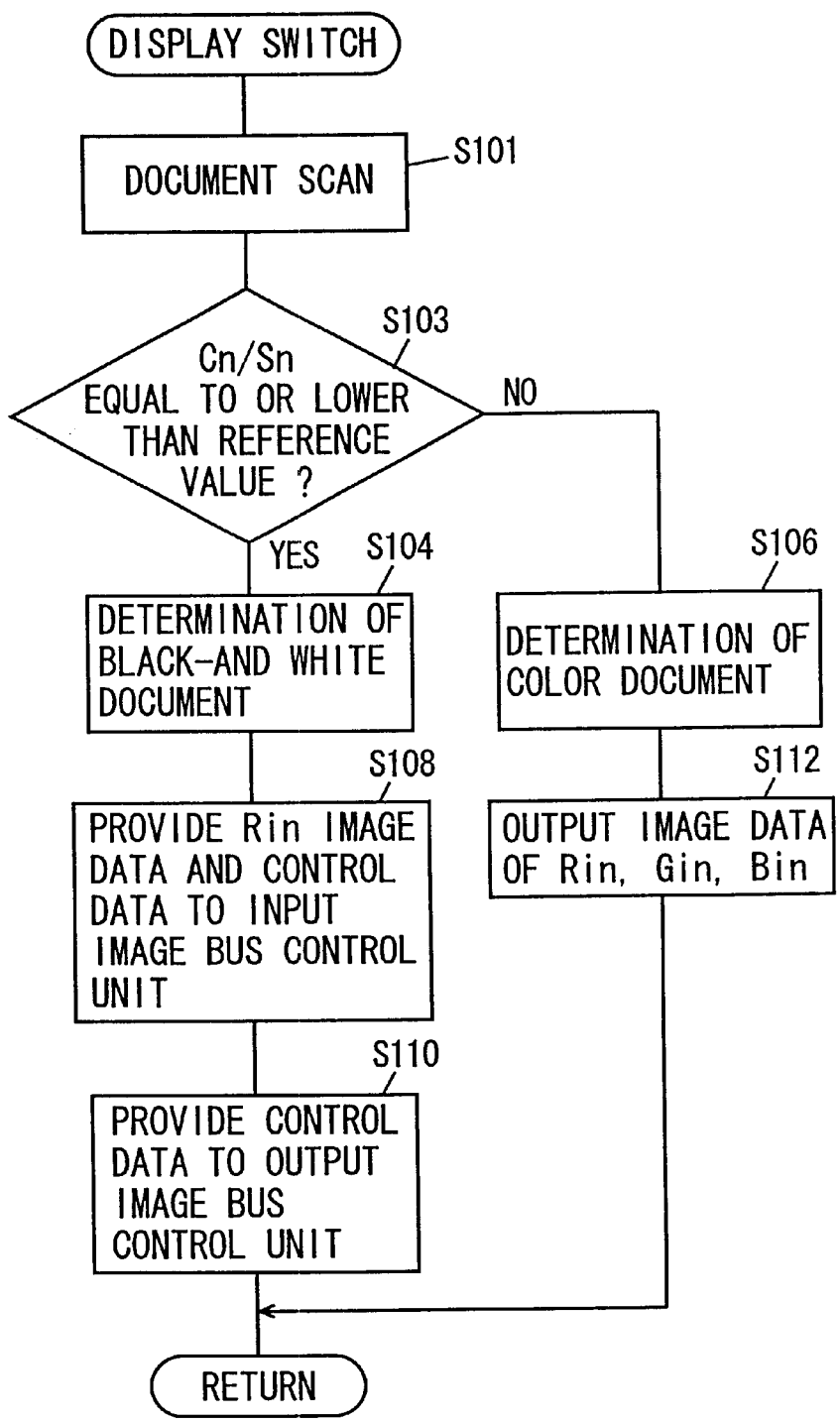
FIG. 13 is a flow chart of a modification of an embodiment of the present invention.

In the flow chart of FIG. 13, the process of steps S101–S106 is identical to that of FIG. 6. Therefore, description thereof will not be repeated.

Following the process of step S104, the black-and-white document image data in R data storage memory Rin and control data are provided to input image bus control unit 105 at step S108. The control data is used to send each image data of R data storage memory Rin divided into three to MPU 113a–113c. For example, input image bus control unit 105 is switched according to the header data of the 3-divided image data.

At step S110, the control data is provided to output image bus control unit 115. This is used to arrange the sequence of the data of MPU 113a–113c. The arranged data are stored in R data storage memory Rout.

Following the process of step S106, control is provided so that the image data of the color document is output from R, G and B data storage memories Rin, Gin and Bin at step S112. The data of R, G and B are processed by MPU 113a–113c, respectively, and stored in R, G and B data storage memories Rout, Gout and Bout, respectively.

Similar control with software can be carried out in the second and third embodiments.

In the above embodiments, parallel processing is carried out with a plurality of processors in one apparatus. The parallel process can be carried out using a plurality of apparatuses.

In the above embodiments, determination of whether the image data corresponds to a color document or a black-and-white document is made automatically. This determination can be made manually. More specifically, the operator designates a color image or a black-and-white image through the keys on the operation panel. Determination is made of a color image or a black-and-white image according to this designation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image data processing apparatus comprising:
    a determination unit for determining whether image data to be processed represents a monochromatic image or a color image, and
    a processing unit for processing the image data,
    wherein said processing unit comprises
        a plurality of processors for processing the image data divisionally in parallel,
        a control unit for assigning the image data to be processed to each of said processors according to a determination result of said determination unit.

2. The image data processing apparatus according to claim 1, wherein said control unit divides the image data into a plurality of regions and assigns the divided image data to each of said processors when a determination result by said determination unit represents a monochromatic image,
    wherein said control unit divides the image data into each color and assigns the divided image data to each of said processors when the determination result by said determination unit represents a color image.

3. The image data processing apparatus according to claim 2,
    wherein each of said plurality of regions is a region where one page is divided into said plurality of regions.

4. The image data processing apparatus according to claim 2,
   wherein each of said plurality of regions is a region of one page.

5. The image data processing apparatus according to claim 1,
   wherein said control unit assigns image data for every predetermined number of pages to each of said processors when a determination result by said determination unit represents a monochromatic image,
   wherein said control unit assigns image data for every number of pages less than said predetermined number of pages to each of said processors when the determination result by said determination unit represents a color image.

6. The image data processing apparatus according to claim 1, wherein said control unit includes a plurality of memories corresponding to said plurality of processors, each memory storing the image data divisionally,
   wherein each of said plurality of processors reads out the image data stored in a corresponding memory and processes the image data.

7. The image data processing apparatus according to claim 6, wherein said control unit divides the image data into a plurality of regions and stores the image data into said memory for each region,
   wherein said control unit divides the image data for each color and stores the image data into said memories for each color when the determination result by said determination unit represents a color image.

8. The image data processing apparatus according to claim 6, wherein said control unit stores the image data for every predetermined number of pages in each of said memories when a determination result by said determination unit represents a monochromatic image,
   wherein said control unit stores the image data for every number of pages less than said predetermined number of pages into each of said memories when the determination result by said determination unit represents a color image.

9. The image data processing apparatus according to claim 1, wherein said determination unit analyzes and determines based on the image data.

10. The image data processing apparatus according to claim 1, wherein said determination unit provides determination according to a key input of an operator.

11. An image data processing method comprising:
    a determination step of determining whether image data to be processed represents a monochromatic image or a color image,
    an assignment step of dividing the image data to be processed into a plurality of blocks and assigning the divided image data to a plurality of processors according to a determination result of said determination step, and
    a processing step of processing in parallel image data assigned at said assignment step by said plurality of processors.

12. The image data processing method according to claim 11, wherein the image data is divided into a plurality of regions and assigned to each of said processors in said assignment step when a determination result by said determination step represents a monochromatic image,
    wherein the image data is divided into each color and assigned to each of said processors in said assignment step when the determination result by said determination step represents a color image.

13. The image data processing method according to claim 12, wherein each of said plurality of regions is a region where one page is divided into a plurality of regions.

14. The image data processing method according to claim 12, wherein each of said plurality of regions is a region of one page.

15. The image data processing method according to claim 11, wherein the image data is assigned to each of said processors for every predetermined number of pages in said assignment step when a determination result by said determination step represents a monochromatic image,
    and wherein the image data is assigned to each of said processors for every number of pages less than said predetermined number of pages in said assignment step when the determination result by said determination step represents a color image.

16. An image data processing apparatus comprising:
    an image reader for dividing a document image into image data of a plurality of color components and reading out the document image,
    a determination unit for determining whether the document image read out by said image reader is a monochromatic image or a color image, and
    a processing unit for processing the image data,
    wherein said processing unit comprises
    a plurality of processors for processing the image data divisionally in parallel, and
    a control unit for assigning the image data to be processed to each of said processors according to a determination result of said determination unit.

17. The image data processing apparatus according to claim 16, wherein said control unit includes a plurality of memories corresponding to said plurality of processors, each memory storing the image data divisionally,
    wherein each of said plurality of processors reads out image data stored in a corresponding memory and processes the image data.

18. The image data processing apparatus according to claim 17, wherein said control unit converts the image data formed of a plurality of color components into monochromatic component image data, and divides said monochromatic component image data into a plurality of regions to store the monochromatic component image data in said memories for each region when a determination result by said determination unit represents a monochromatic image,
    wherein said control unit divides the image data for every color to store the image data into said memories for every color when the determination result by said determination unit represents a color image.

19. The image data processing apparatus according to claim 17, wherein said control unit converts the image data formed of a plurality of color components into monochromatic component image data, and stores the monochromatic component image data for every predetermined number of pages into each of said memories when a determination result by said determination unit represents a monochromatic image,
    wherein said control unit stores the image data for every number of pages less than said predetermined number of pages into each of said memories when the determination result by said determination unit represents a color image.

20. The image data processing apparatus according to claim 16, wherein said processing unit converts the image data formed of a plurality of color components into monochromatic component image data and processes the monochromatic component image data when a determination result by said determination unit represents a monochromatic image.

21. The image data processing apparatus according to claim 20, wherein said monochromatic component image data is an average of said image data of a plurality of color components.

22. The image data processing apparatus according to claim 20, wherein said monochromatic component image data is image data of a particular color component out of said plurality of color components.

* * * * *